United States Patent [19]
Tan et al.

[11] Patent Number: 5,274,508
[45] Date of Patent: Dec. 28, 1993

[54] TAPE STORAGE DEVICE FOR STORING AUDIO DATA IN THE AMBLE FRAMES OF A DDS FORMAT TAPE

[75] Inventors: Eng T. Tan; Simon Southwell, both of Bristol, United Kingdom

[73] Assignee: Hewlett-Packard Company, Palo Alto, Calif.

[21] Appl. No.: 776,240

[22] PCT Filed: Mar. 9, 1990

[86] PCT No.: PCT/GB90/00357

§ 371 Date: Dec. 17, 1991

§ 102(e) Date: Dec. 17, 1991

[87] PCT Pub. No.: WO91/14266

PCT Pub. Date: Sep. 19, 1991

[51] Int. Cl.$^5$ .................. G11B 5/09; G11B 20/14; G11B 20/16
[52] U.S. Cl. ........................... 360/48; 360/40
[58] Field of Search ............. 360/48, 53, 19.1, 39, 360/40

[56] References Cited

U.S. PATENT DOCUMENTS 5,134,529 7/1992 Inazawa et al. ............. 360/40 X
5,182,678 8/1988 Hatanaka et al. ............ 360/48 X

FOREIGN PATENT DOCUMENTS 0286412 10/1988 European Pat. Off.
0308148A2 3/1989 European Pat. Off.
0327188A2 8/1989 European Pat. Off.
3911692A1 11/1989 Fed. Rep. of Germany.
2217509 10/1989 United Kingdom.

OTHER PUBLICATIONS

"Designing a Data Storage Format for Digital Audio Tape LDAT", Odaka et al., 1988 by Hewlett-Packard, A1-A5.

Primary Examiner—Aristotelis Psitos
Assistant Examiner—Jennifer Pearson

[57] ABSTRACT

A helical-scan tape storage device is operative to write computer data to tape according to a predetermined format in which the data is store in tracks arranged in groups. These groups are optionally separated by one or more amble track To enable auxiliary data, such as audio data to be stored within the format, the storage device is arranged to store a succession of N ambles into which the auxiliary data is written. Using the amble tracks to store auxiliary data permits storage devices that have been designed only with regard to computer data storage to read tapes containing both computer and auxiliary data, since the auxiliary-data-containing amble tracks are ignored by such a device. A storage device designed to extract auxiliary data from ambles can readily recover the auxiliary data.

20 Claims, 8 Drawing Sheets (PRIOR ART) FIG 1

BASIC GROUP

FIG 5

G1 SUB - GROUPS

FIG 6

G2 SUB - GROUPS

FIG 7

| WORD NUMBER | CHANNEL A | | CHANNEL B | |
|---|---|---|---|---|
| | LOWER BYTE | UPPER BYTE | LOWER BYTE | UPPER BYTE |
| | 1 2 3 4 5 6 7 8 | 1 2 3 4 5 6 7 8 | 1 2 3 4 5 6 7 8 | 1 2 3 4 5 6 7 8 |
| HEADER → 0 | DF-ID  0 0 0 0 | LF - ID | DF-ID  0 0 0 0 | LF - ID |
| 1 | D0 | D1 | D2 | D3 |
| 2 | D4 | D5 | D6 | D7 |
| 3 | D8 | D9 | D10 | D11 |
| ⋮ | ⋮ | ⋮ | ⋮ | ⋮ |
| 1438 | D5748 | D5749 | D5750 | D5751 |
| 1439 | D5752 | D5753 | D5754 | D5755 |
| 1440 ⋮ 1455 | ALL BYTES SET TO ALL ZEROs | | | |

G3 SUB - GROUP

FIG 8

TWIN ARRAYS FOR G4 SUB - GROUP

FIG 9

MAIN DATA BLOCK

FIG 10

SUB DATA BLOCK

| ZONE | CONTENTS | NUMBER OF BLOCKS |
|---|---|---|
| MARGIN ZONE 1 | MARGIN BLOCKS | 11 |
| SUB ZONE 1 | PREAMBLE BLOCKS<br>REC. SUB DATA BLOCKS<br>POSTAMBLE BLOCKS | 2<br>8<br>1 |
| ATF ZONE 1 | SPACER BLOCKS<br>ATF BLOCKS<br>SPACER BLOCKS | 3<br>5<br>3 |
| MAIN ZONE | PREAMBLE BLOCKS<br>REC. MAIN DATA BLOCKS | 2<br>128 |
| ATF ZONE 2 | SPACER BLOCKS<br>ATF BLOCKS<br>SPACER BLOCKS | 3<br>5<br>3 |
| SUB ZONE 2 | PREAMBLE BLOCKS<br>REC. SUB DATA BLOCKS<br>POSTAMBLE BLOCKS | 2<br>8<br>1 |
| MARGIN ZONE 2 | MARGIN BLOCKS | 11 |

SEQUENCE OF RECORDING ↓    196

FORMAT OF A TRACK

TAPE STORAGE DEVICE FOR STORING AUDIO DATA IN THE AMBLE FRAMES OF A DDS FORMAT TAPE

FIELD OF THE INVENTION

The present invention relates to a tape storage device and in particular, but not exclusively, to a tape storage device intended for storing host computer data but which can also be used to store audio data.

BACKGROUND OF THE INVENTION

Tape storage devices for writing data to tape are known of the type comprising helical-scan recording means operative to write to tape in a succession of tracks each having a data area for the storage of data; and signal processing means operative to receive first data signals, representative of first data to be stored, and to process said first data signals to generate and output track signals to said recording means whereby to cause the latter to write the first data to tape in accordance with a predetermined format in which said first data is stored in the data areas of one or more groups of tracks with further tracks, hereinafter "amble" tracks, being used to perform auxiliary functions, the said groups of tracks and said amble tracks being such as to permit them to be distinguished from each other upon reading. Such tape storage devices are generally also arranged to read tapes written in accordance with said predetermined format, although a separate tape storage device may be provided for this purpose. Thus, tape storage devices for reading data from tape are known of the type comprising helical-scan reading means operative to read a tape written in accordance with said format and to output track signals representative of the tracks recorded thereon; and signal processing means operative to receive said track signals from the reading means and to process said track signals to generate and output first data signals representative of said first data recorded in the data areas of the groups of tracks, this processing involving distinguishing signals derived from said groups of tracks from signals derived from said amble tracks whereby to avoid any contents of the amble tracks being treated as first data.

Tape storage devices of the aforesaid types include storage devices operative to write/read data to/from tape in accordance with the Digital Data Storage (DDS) format described in the document "Digital Data Storage Format Description" (Revision B, October 1988) available from Hewlett-Packard Limited, Bristol, England. The DDS format is based on the DAT digital audio recording format but includes modifications and extensions to the basic DAT format to render it suitable for storing computer data. For a storage device implementing the DDS format, the aforesaid first data is constituted by the computer data, this data being stored in groups of tracks that are optionally separated by amble tracks.

Because computer data is essentially asynchronous (by which is here meant that it does not need to be provided at a constant transfer rate), the DDS format does not need to include the same amount of first data in every track but can afford to have an uneven distribution of data between tracks. More particularly, as well as the amble tracks not being available for first data, at least a portion of one or more tracks of each said group of tracks is used to store an index of record and file separators relating to the first data held in the group.

For certain applications it would be useful if both computer data and audio data could be at least read by the same DDS storage device.

One possible way of achieving this would be to arrange for the DDS device to be able to play a tape written on a DAT audio player. The underlying format of the DDS drive is the 48 KHz mode of the DAT specification so that much of the DDS storage device electronics is similar to that of a DAT player. However, for this approach to work the DDS storage device would need to be altered to recognize the DAT format and read the audio data, as well as cope with the absence of a lead-in area as is provided on a DDS tape. Furthermore, that part of the DDS device electronics expecting to find data organized into groups would need to be disabled or bypassed. Clearly, this approach would require substantial redesign of a standard DDS-only tape storage device.

A different approach would be to store audio data as first data within groups of tracks in accordance with the DDS format. However, as already mentioned, the storage of data in groups is really only suitable for asynchronous data rather than synchronous data, such as audio data, where a steady transfer rate is needed. In order to overcome the transfer rate fluctuations that would be caused by amble tracks and group indexes a substantial data buffer would be required with the attendant cost and complexity. In addition, some way would need to be found to distinguish audio data from computer data so that the former is not mistaken for the latter.

SUMMARY OF THE INVENTION

An object of the present invention is to provide for the writing/reading of second data, such as audio data, by tape storage devices of the above type.

According to one aspect of the present invention there is provided a tape storage device of the aforesaid type for writing data to tape, wherein the said signal processing means is provided with insertion means arranged to receive second data signals, representative of second data to be stored, and operative to cause said second data to be written in the data areas of amble tracks.

Where the second data is asynchronous and small in quantity, there may be circumstances in which the generation of amble tracks during normal operation of the storage device to write first data, will be sufficient to meet the requirement to store the second data. However, for most applications it will be necessary for the signal processing means to generate extra amble tracks for storing the second data; in particular, for high-quality audio data and similar synchronous data, the signal processing means will need to generate a continuous series of amble tracks for storing this data. Preferably, this is done automatically by the signal processing means whenever second data is to be stored.

Since a tape storage device of the aforesaid type for reading data from tape is operative to distinguish amble tracks from groups of tracks storing the first data, there is no risk of the second data being mistaken for the first data upon reading; however, extra circuitry will be required to extract the second data. More particularly, according to a second aspect of the present invention, there is provided a tape storage device of the aforesaid type for reading data from tape, wherein the said signal processing means includes extraction means operative to extract from the data areas of said amble tracks, any second data written therein and to generate and output second data signals representative of any such second data.

Although the provision of second-data extraction means is clearly of substantial benefit, an advantage of the present invention is in fact that data-reading devices which have not been adapted to read second data, will generally still be able to read first data off a tape written with both first and second data.

In a known form of data-writing storage device of the aforesaid type, the signal processing means comprises a first write-processing section arranged to receive said first data signals and to generate intermediate signals including signals for constituting the data areas both of said groups of tracks and of said amble tracks, and a second write-processing section operative to produce said track signals from said intermediate signals. For such devices, the insertion means for inserting second data advantageously comprises:

amble detection means connected to monitor said intermediate signals whereby to detect said signals for constituting said amble data areas, and multiplexor means connected to receive both said intermediate signals and said second data signals and selectively operable to pass one or other of these signals to said second write processing means.

The amble detector means is connected to control said multiplexor means such that the intermediate signals are normally passed to said second write processing means, the second data signals only being passed to the second write-processing means during the time, or a portion thereof, when the amble-data-area signals are detected. Where the first write-processing section generates, as part of said intermediate signals, identification signals for distinguishing between said groups of tracks and said amble tracks, said insertion means is preferably operative to allow said identification signals, including those associated with amble tracks, to pass unaltered to said second write processing means.

As an alternative to substituting second data for the amble-body data of previously-created ambles, it is of course possible to arrange for second data to be incorporated into ambles at their point of generation.

In a known form of data-reading storage device, the said signal processing means comprises a first read-processing section arranged to receive said track signals and to generate intermediate signals representative of the contents of the data areas both of said groups of tracks and of said amble tracks, and a second read-processing section operative to produce said first data signals from said intermediate signals. For such devices, the said extraction means preferably include:

amble detection means connected to monitor said intermediate signals whereby to detect those signals representative of the contents of said amble data areas, and output means connected to receive said intermediate and controlled by said amble detection means signals and controlled by said amble detection means to utilize said signals representative of the contents of said amble data areas as the second data signals.

Generally with regard to how first-data tracks are distinguished from amble tracks, this is preferably done by generating a header for each pair of tracks (such a pair being known as a 'frame') and storing the header in the data areas of the corresponding frame; by including a frame identifier in the header, it is possible readily to distinguish amble frames from other frames.

The second data may be derived from a single source or from a selected one of several sources. In this latter case, a source identifier is preferably stored as part of the second data or as first data in an associated group; on reading, this source identifier is examined and used to output the second data to an appropriate output channel.

BRIEF DESCRIPTION OF THE DRAWINGS

A tape storage device embodying the present invention will now be particularly described, by way of non-limiting example, with reference to the accompanying diagrammatic drawings, in which.

DETAILED DESCRIPTION OF PREFERRED EMBODIMENT

The present invention is described below in relation to a tape storage device that stores and retrieves host computer data on tape generally in accordance with the DDS (Digital Data Storage) Format jointly developed by Hewlett-Packard Limited and Sony Corporation. A detailed description of the DDS format is given in the document "Digital Data Storage Format Description" (Revision B dated October 1988 available from Hewlett-Packard Limited, Bristol, England). The DDS format for the storage of computer data utilizes and builds upon the 48 KHz mode of the DAT (Digital Audio Tape) format used for the storage of PCM audio data; a detailed description of the DAT format can be found in the document "DAT Conference Standard" (March 1988, Electronic Industries Association of Japan Tokyo, Japan) The DAT format and, accordingly, the DDS format, both employ a helical-scan recording technique in which tape storage medium is moved obliquely over a rotating head drum with a 90° wrap angle; the drum carries two read/write heads which write pairs of overlapping, opposite azimuth, tracks known as frames.

Tape storage devices implementing the DDS format are available, inter alia, from Hewlett-Packard Limited and are generally referred to as DDS drives.

To facilitate an understanding of the present invention, a brief overview of the main features of the DDS format will now be given followed by a description of the main functional elements of a DDS drive.

DDS Format Overview

Figure 1:
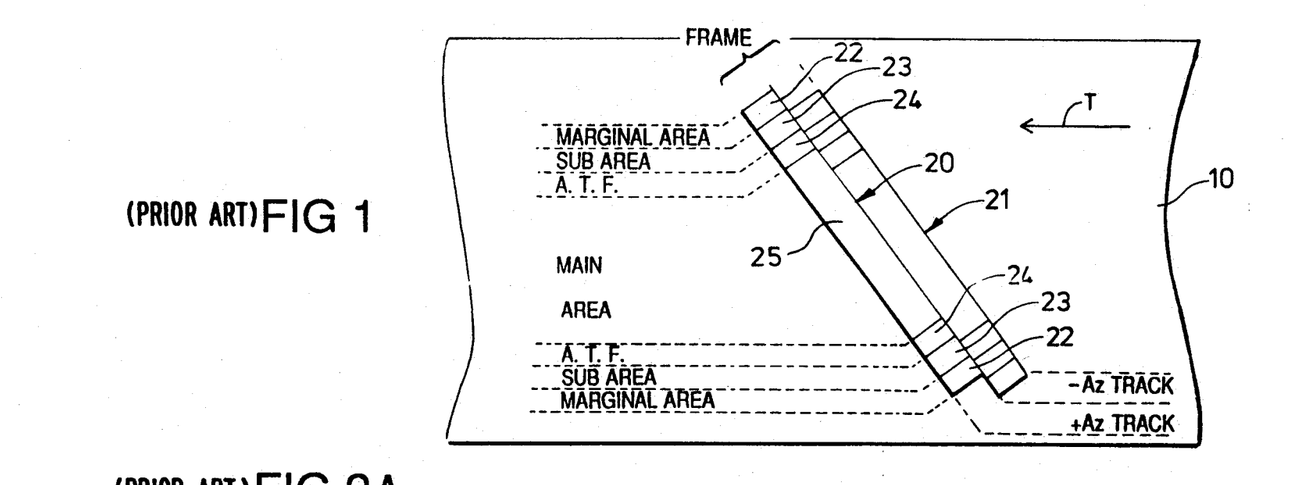
FIG. 1 illustrates the format of a frame written to tape in accordance with the DAT format specification.

The basic unit for writing and reading information to/from a tape 10 is a frame FIG. 1 illustrates the format of a frame which, as already mentioned, is made up of two opposite azimuth tracks 20, 21. In FIG. 1, the arrow T indicates the direction of tape movement. Each track comprises two marginal areas 22, two sub areas 23, two ATF (Automatic Track Following) areas 24 and a main area 25. The ATF areas 24 provide signals enabling the heads of the head drum (not shown) to accurately follow the tracks in known manner. The main area 25 is used to store the data (host data) provided to the tape device by the host computer (the host data comprises user data supplied as records by the host computer and separator marks that indicate logical separation of the user data). The sub areas 23 are primarily used to store auxiliary information known as sub codes that relate for example, to certain recording parameters (such as format identity, tape parameters etc.), and tape usage history.

Figure 2A:
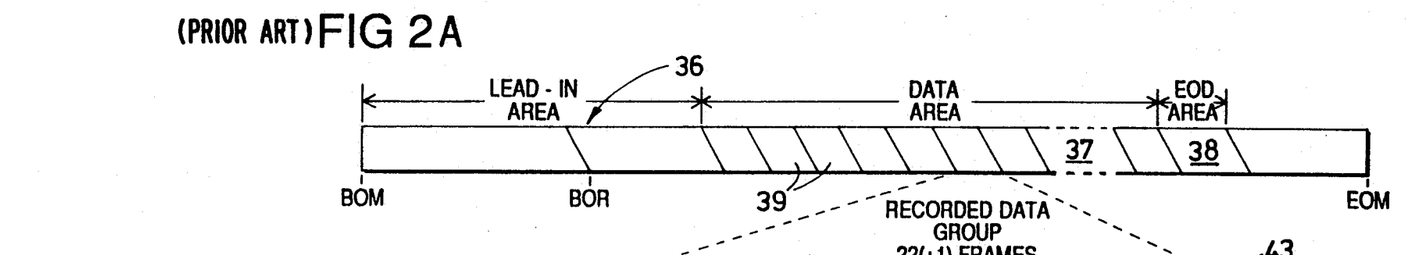
FIG. 2A shows the layout of a tape written according to the DDS format.

The general organization of frames along a tape (that is, the tape layout) is illustrated in FIG. 2A. As can be seen, the tape is organized into three main areas, namely a lead-in area 36, a data area 37 and an end-of-date (EOD) area 38 The ends of the tape are referenced BOM (beginning of media) and EOM (end of media) Host data is recorded in the main areas of the frames written in the data area 37. The lead-in area 36 includes a system log area, between a beginning-or-recording (BOR) mark and the data area 37, where system information is stored. A tape Area ID sub code stored in the sub area 23 of each frame, enables the system log area, data area 37 and EOD area 38 to be distinguished from one another.

Figure 2B:
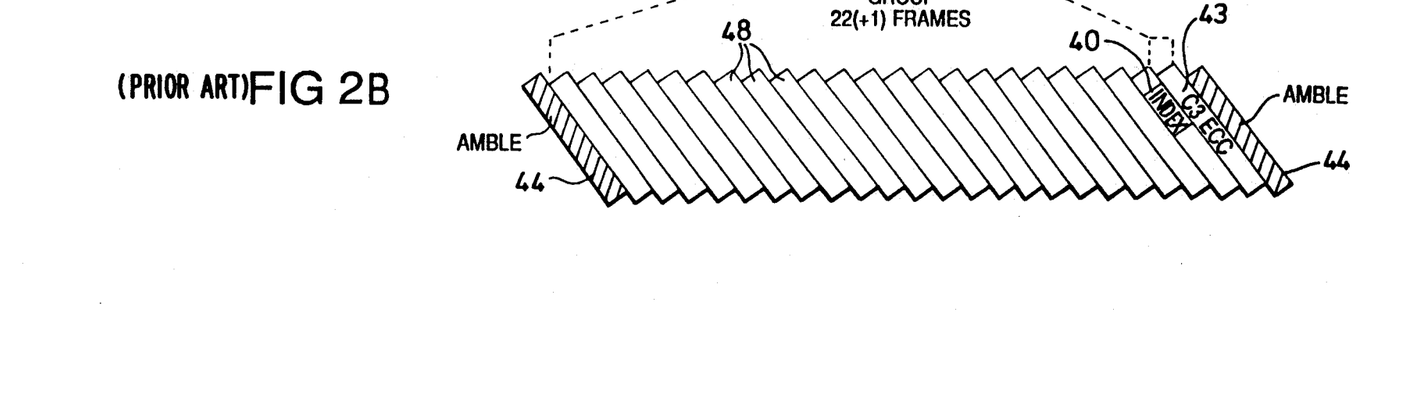
FIG. 2B shows the composition of a recorded data group written in a data area of the tape layout of FIG. 2A.

As shown in FIG. 2B, the frames 48 of the data area are arranged in recorded data groups 39 each of twenty two valid frames (plus an optional frame 43—the C3 ECC frame—storing error correction code for the group).

Within a group, user data and separator marks are separately stored, the user data being stored as a continuous run of bytes across the main areas of successive frames without record markers, while information on the division of user data into records and the separator marks are held in an index 40 that extends forwards from the end of the main area of the last frame in the group. (Note that the index will in fact be physically dispersed within the last frame due to a byte-interleaving process employed during recording after formation of the index.)

These recorded data groups are separated from each other by one or more amble frames 44 the main areas of which are filled with a randomized all-zeroes pattern. Ambles are only permitted in the data area 37.

Further details of the DDS format will become apparent from the following description of a DDS drive that implements the format.

DDS Drive

Figure 3:
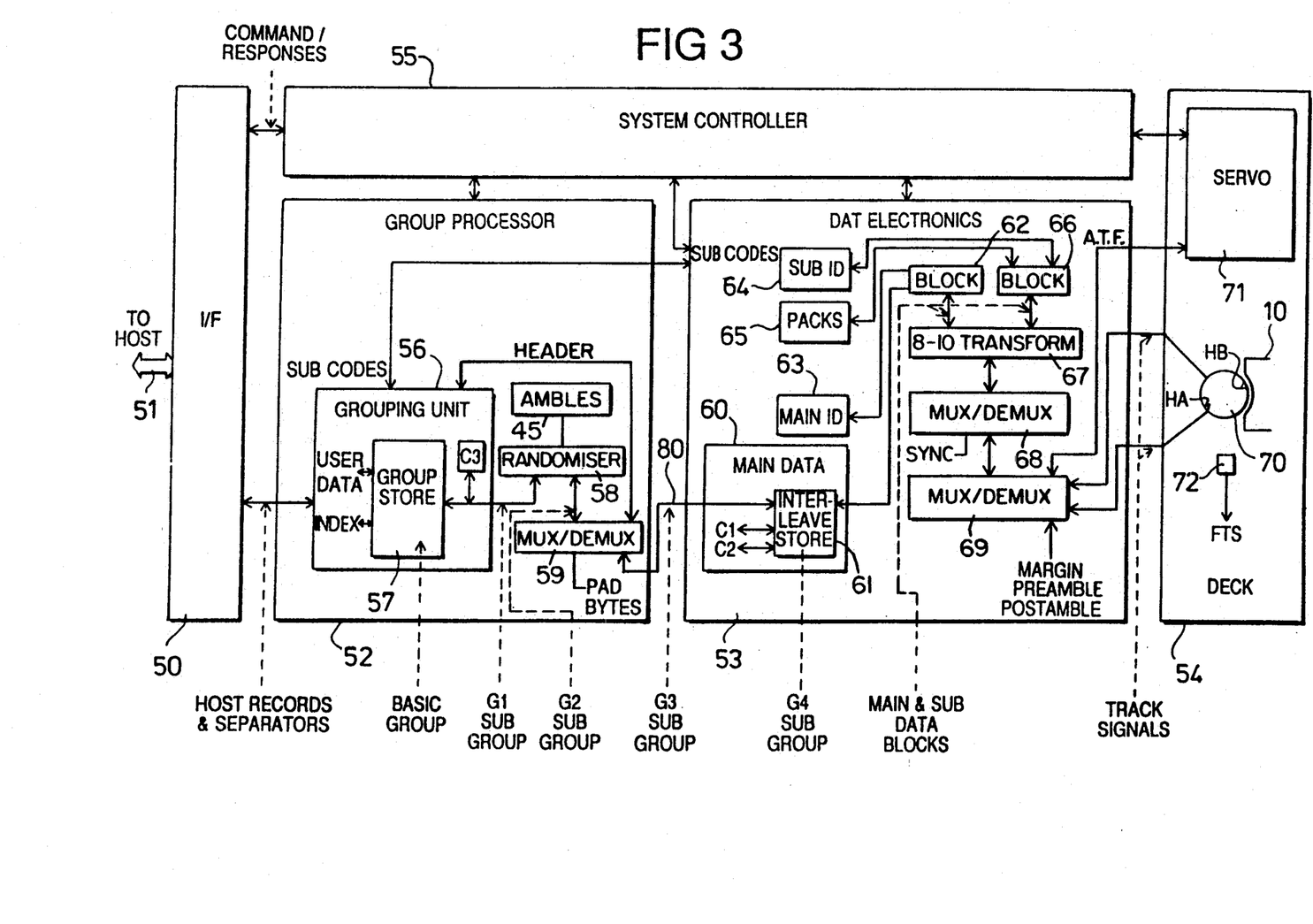
FIG. 3 is a block diagram of a tape storage device arranged to implement the DDS format.

FIG. 3 is a functional block diagram of a DDS drive The device comprises:
an interface unit 50 for interfacing the drive with a host computer (not shown) via a bus 51;
a group processor 52 for processing user data records and separator marks into and out of indexed groups;
DAT electronics 53 which effects low-level signal processing, substantially as specified in the DAT standard, but with certain modifications as specified in the DDS format; this low-level processing serves to convert a byte stream supplied to it by the group processor 52 into track signals ready for recording and to reconvert track signals back into a byte stream for the group processor;
a helical-scan tape deck 54 for writing to and reading from a tape medium; and
a system controller 55 for controlling the operation of the other elements of the drive in response to commands received from the host via the interface unit 50.

The drive is arranged to respond to commands from the host computer to load/unload a tape, to store a data record or separator mark, to search for selected separator marks or records, and to read back the next record.

The interface unit 50 is arranged to receive the commands from the computer and to manage the transfer of data records and separator marks between the tape storage device and computer Upon receiving a command from the computer, the unit 50 passes it on to the system controller 55 which, in due course, will send a response back to the computer via the unit 50 indicating compliance or otherwise with the original command Once the drive has been set up by the system controller 55 in response to a command from the computer to store or read data, the interface unit 50 will also control the passage of records and separator marks between the computer and group processor 52.

A description will now be given of the general operation of the drive in terms of the writing of data to tape; the operation of the drive during reading of data will be apparent to persons skilled in the art as processes are either simply reversed or data assembled during writing to aid the reading process is appropriately put to work during the latter (for example, error-correction codes calculated during writing are used during reading to correct errors).

Figure 4:
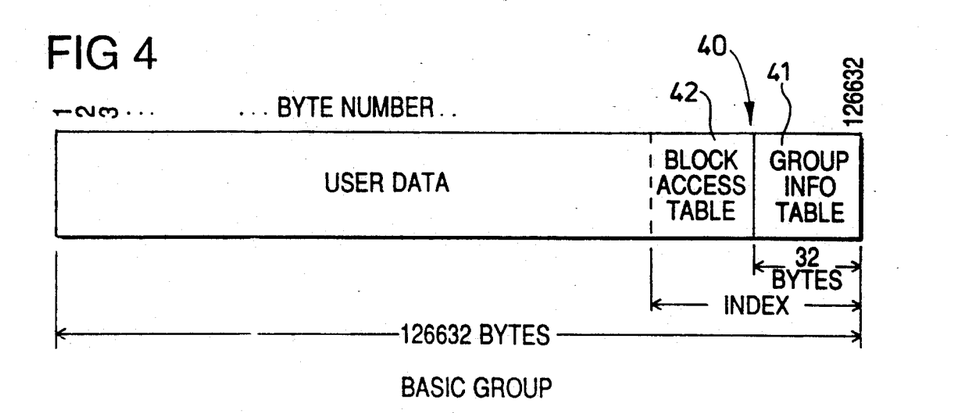
FIG. 4 illustrates a basic group produced by a group processor of the FIG. 3 storage device.

During data storage a grouping unit 56 of the group processor 52 is arranged to organize the data that is provided to it in the form of user data records and separator marks, into data packages referred to as "basic groups". The grouping unit 56 is also arranged to construct the index for each basic group. The unit 56 assembles each basic group in a group store 57 The form of a basic group is illustrated in FIG. 4 and, as can be seen, each basic group comprises 126632 bytes in all divided between user data (without any record marks) and an index 40 grown from the end of the basic group. The index 40 itself comprises two main data structures, namely a group information table 41 storing general information about the basic group (number of records, separator marks, etc), and a block access table 42 containing more specific data on the contents of the group (including information regarding the division of user data into records and the logical location of separator marks). The group information table 41 is stored in a fixed location at the end of the group and is the same size (32 bytes) regardless of the contents of the basic group. In contrast, the block access table 42 varies in size depending on the contents of the group and extends from the group information table backwards into the remainder of the user data area of the frames of the group. Entries are made in the block access table from the group information table backwards to the boundary with user data.

During data writing when the host is ready to pass a data record, the interface 50 asks the grouping unit 56 whether it is ready to receive the record. The grouping unit 56 may initially send a "wait" reply but, in due course, enables the transfer of the data record from the host to the group store 57.

Typically, a host transfers records one at a time although multiple record transfers may be permitted for shorter records.

The record will be transferred to a group store location that corresponds to the eventual positioning of the record user data within the basic group of which it is to form a part. Information on the size of the record is used by the grouping unit 56 to update the group index The index is constructed in a location in the group store appropriate to its position at the end of a basic group.

If a transfer from the host cannot all fit inside a basic group, it is said to "span" the group boundary. The first part of the transfer goes into one basic group and the rest into one or more subsequent basic groups. If no span occurs, the group index is updated and the grouping unit 60 waits for another write command. If a span occurs, the index of the current basic group is updated and that group is available for writing to tape. The next group is begun and the data from the host goes directly into the beginning of that new basic group. When the host sends a separator mark the grouping unit 56 will update the index of the current basic group accordingly.

The grouping unit 56 also generates certain sub-codes relevant to the current basic group such as the number of separator marks and records received counted from the first group.

Figure 5:
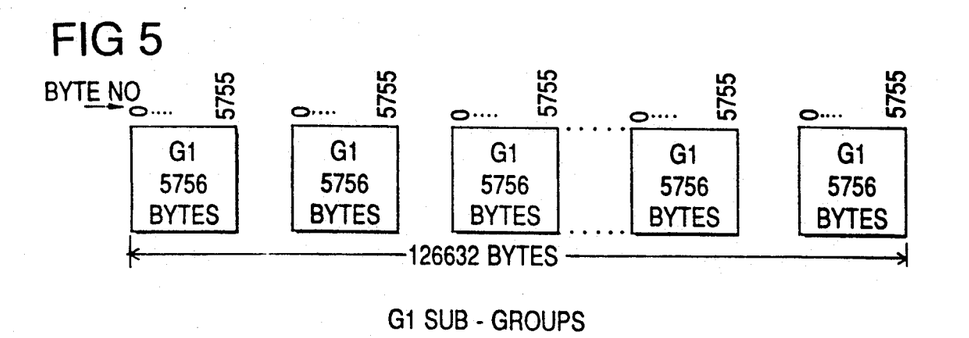
FIG. 5 illustrates G1 sub-groups produced by the group processor of the FIG. 3 storage device.

During data writing, each basic group is transferred out of the group store in twenty two blocks each of 5756 bytes known as G1 sub-groups (see FIG. 5). Each such sub-group eventually forms the data contents of a respective recorded frame. Each G1 sub-group is allocated an identifying number known as the logical frame identification number (LF-ID) which the grouping unit 56 incorporates into a header. This header is subsequently combined into the main data stream along with the associated G1 sub-group (see below).

Optionally, the grouping unit may also calculate an error correction code (C3 code) block for each basic group. This C3 code forms its own G1 sub-group that is appended as a twenty third sub-group to the stream of sub-groups transferred out of the grouping unit.

When data is being read from tape, the grouping unit 56 is arranged to receive G1 sub-groups and write them into the group store 57 in such a manner as to build up a basic group. The grouping unit 56 can then access the group index to recover information on the logical organization (record/entity structure, separator marks) of the user-data in the group. Using this information, the group processor 52 can pass a requested record or separator mark to the host via the interface 50. The assembly of G1 sub-groups back into a basic group is facilitated by the associated logical frame IDs provided to the grouping unit 56 in the headers stripped from the sub-groups earlier in the reading process.

Figure 6:
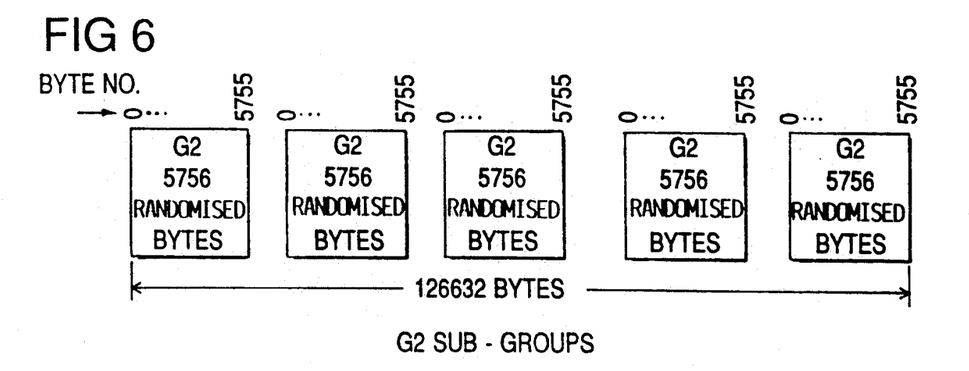
FIG. 6 illustrates G2 sub-groups produced by the group processor of the FIG. 3 storage device.

Returning now to the description of the data writing process, the G1 sub-groups output from the grouping unit 56 are subject to a randomizing process, of known form, in randomizer 58 in order to provide a consistent RF envelope on the read signal, independent of the data pattern in the frame. The output of the randomizer 58 is a succession of G2 sub-groups (see FIG. 6).

One or more amble sub-groups may optionally be added to the end of each group of G1 sub-groups fed to the randomizer 58, the control of amble addition being effected by an amble-control functional unit 45 of the group processor 52. These amble sub-groups are written to tape as amble frames. The contents of an amble sub-group are constituted by zero bytes which after processing (including randomizing in randomizer 58) form the contents of the main area 25 of the corresponding amble frame, the only data in these main areas being a header associated with each amble. The main purpose of adding in amble sub-groups is to permit uninterrupted writing by the deck 54 if, for any reason, there is a delay in providing the next following group for writing to the deck. Thus, for example, if there is a delay in providing host data to the processor 52 to complete the next basic group, the unit 45 oversees the insertion of one or more amble sub-groups until such time as the processor 52 can complete the next basic group (or until a time-out has been reached and continuous writing is terminated, whereupon a repositioning operation must occur before the next group is written to tape) Any number of amble frames may be written to tape after a recorded data group.

The header associated with each amble sub-group is generated by the grouping unit 56 when the amble-control unit 45 determines that an amble sub-group is to be inserted The logical frame ID of the header is set to zero to indicate that the sub-group is an amble sub-group and therefore may be ignored during reading when the sub-group is passed to the group processor 52. The sub codes to be recorded in the sub-areas of an amble frame are also provided by the grouping unit 56 and, in fact, comprise sub codes relevant to the last preceding group.

Figure 7:
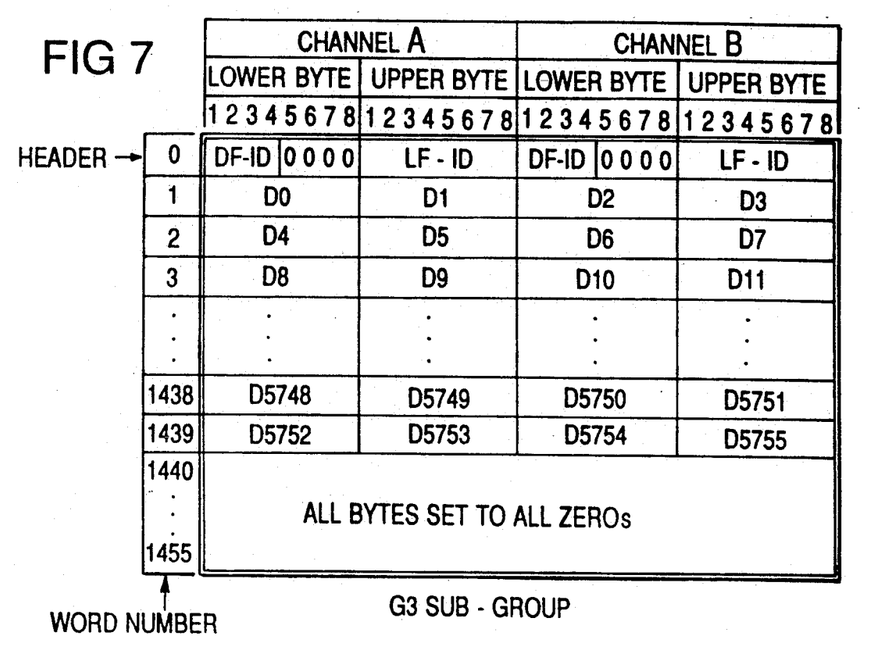
FIG. 7 illustrates the composition of a G3 sub-group transferred between the group processor and DAT electronics of the FIG. 3 storage device.

Following the randomizer 58, a multiplexer/demultiplexer 59 combines each G2 sub-group with its header and with a number of all-zero padding bytes needed to conform the size of each sub-group with the audio date frame size of the DAT format. The output of the mux/demux 59 is constituted by a succession of G3 sub-groups each of 5824 bytes conceptually arranged as illustrated in FIG. 7 (this arrangement and terminology matches the DAT format). More particularly, the bytes are arranged in rows of four as two 2-byte words, each word being labelled either a channel A word or a channel B word (reflecting the audio associations of the DAT format). The two words in the first row (numbered 0) are constituted by the sub-group header, the words in rows 1 to 1439 are derived from the corresponding G2 sub-group, and the words in rows 1440 to 1455 are the all-zero padding bytes.

As noted above, the header for each sub-group is generated by the grouping unit 56 and is provided in coordination with the output of the corresponding G1 sub-group. The structure of the header of each sub-group can be seen from FIG. 7. Again, as already noted, the header contains a Logical Frame ID (LF-ID); this ID is a one byte code stored in the upper byte position of both channels A and B. The first six bits of the LF-IF indicate the running number of each sub group within a group (1 to 23, the optional C3 frame being frame 23) or is set to zero for an amble frame. Bit seven of the LF-ID is set to ONE to indicate the last sub-group of a group (inclusive of any C3 sub-group). Bit eight of the LF-ID is set to ONE only for a C3 sub-group. In addition to the LF-ID, the header includes a four-bit data format ID (stored in the lower byte position of both channels A and B) which for the DDS format is set to 0000.

Figure 8:
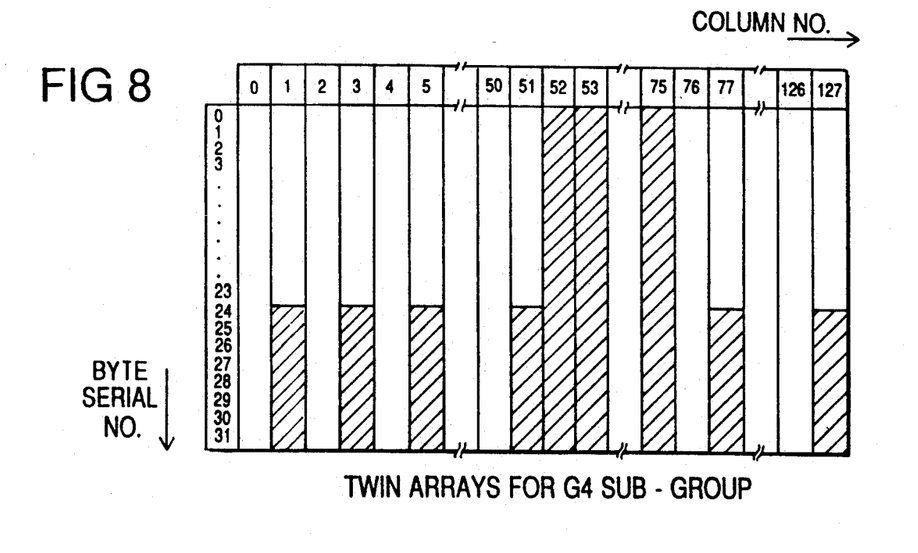
FIG. 8 illustrates one array of twin arrays that form a G4 sub-group produced by the DAT electronics of the FIG. 3 storage device.

The G3 sub groups are passed to a main data processor 60 of the DAT electronics 53 where they are processed substantially in accordance with the 48 KHz mode of the DAT format. More particularly, the bytes of each G3 sub-group undergo an interleaving process to form twin arrays as they are fed into an interleave store 61 of the main data processor 60. This interleaving minimizes the effects of certain media defects. Two sets of error correcting codes (C1 and C2) are then generated and inserted into the twin arrays held in store 61. FIG. 8 illustrates the conceptual form of one of these twin arrays that together constitute a G4 sub group. As can be seen from FIG. 8, each array of a G4 sub group is formed by 128 columns each of 32 bytes. After further processing in the DAT electronics 53, the two arrays of a G4 sub-group will form the contents of the main area of respective tracks of a frame.

Figure 9:
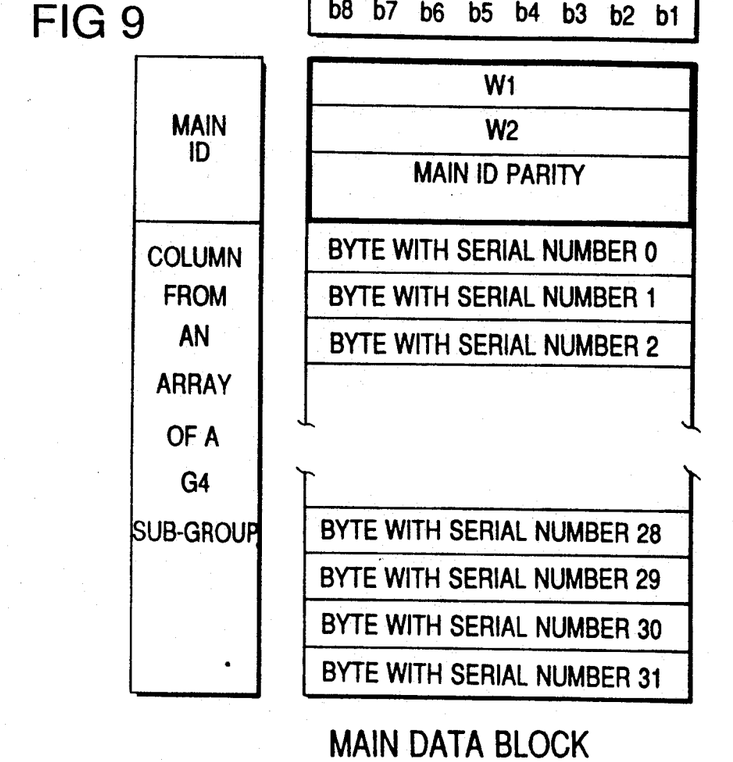
FIG. 9 illustrates the composition of a main data block produced by the DAT electronics of the FIG. 3 storage device.

Each array of a G4 sub-group is next formed into 128 main data blocks (see FIG. 9) each of 35 bytes by combining the 32 bytes of each array column with a three-byte Main ID in a block multiplexer/demultiplexer 62. The Main ID bytes are provided by a main ID unit 63 and are constituted by two bytes W1, W2 and a parity byte. Byte W1 contains format ID and frame number information and byte W2 contains a block number identifying the current main data block within the set of 128 blocks derived from each G4 subgroup group array.

By the foregoing process, each basic group is transformed into 22 pairs of 128 main data blocks (that is 5632 main data blocks) with a further pair of 128 blocks for the C3 and each amble sub-group if present.

In parallel with the generation of the main data blocks, 35-byte sub-data blocks are also generated that contain sub codes supplied to the DAT electronics 53 from the group processor 52 and system controller 55. Thirty two sub-data blocks are generated for each G4 sub group processed (that is, 8 blocks for each of the two sub areas 23 of the two tracks into which the G4 sub group is to be written).

Figure 10:
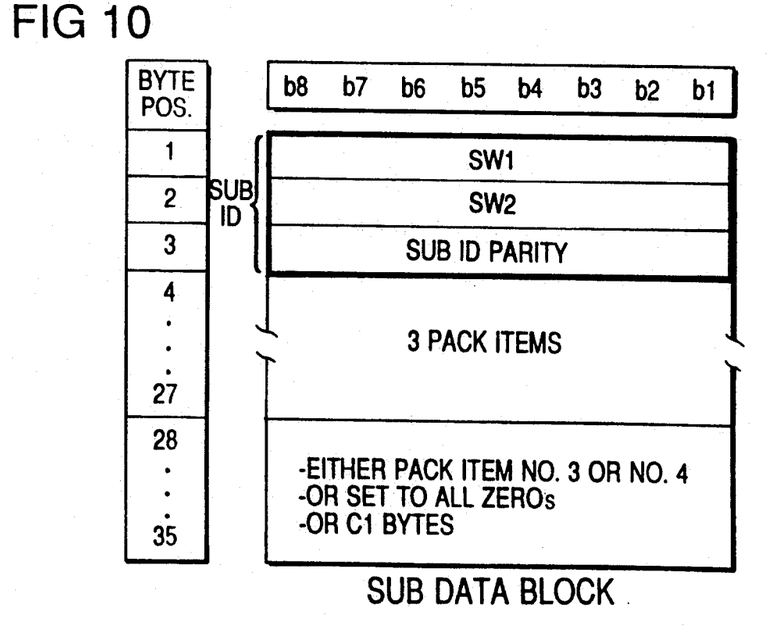
FIG. 10 illustrates the composition of a sub data block produced by the DAT electronics of the FIG. 3 storage device.

The structure of a sub-data block is illustrated in FIG. 10. Each sub data block comprises a three-byte "Sub ID" section 33 and a thirty-two byte "Sub Data" section.

The Sub ID is generated in a sub ID unit 64 and is composed of two information-containing bytes SW1, SW2 and a parity byte. Byte SW2 is used for storing information relating to the current sub data block as a whole (type and address) and the arrangement of the Sub Data section Byte SW1 is used for storing sub codes and in particular, the Area ID indicating the current tape area (this sub code is supplied by the system controller 55).

The Sub Data section of each sub data block is generated in unit 65 and is composed of thirty two bytes arranged into four eight-byte "packs". Each pack is used to store a pack item; there are a number of different types of pack item each holding a particular set of sub codes. The mapping of pack items into the sub data packs is dependent on the current tape area and not all pack items will be present in any given tape area. The identity of the pack item held in a sub-data pack is indicated by a pack-item code that occupies the first half byte of each pack item stored in a pack. With regard to the fourth pack, for every even block this pack is either set to zero or contains the same pack item as the third pack, while every odd block the fourth pack contains a C1 parity byte for the first three packs of the current block and all four packs of the preceding even-numbered sub-data block.

By way of example, pack items coded 1 and 2 contain group, separator, and record counts while pack items 3 and 4 both contain area ID, absolute frame number, LF-ID and check sum data. Pack 3 of every odd sub data block contains pack item 3 while pack 3 of every even sub-data block contains pack item 4.

Certain of the sub code data stored in the packs are cumulative totals of events (such as number of groups) taken from BOR. This is made possible by storing historical data on such events in the packs of the system log area at the end of each tape usage session and then retrieving this data at the start of a new session.

The sub-ID bytes and the packs of the sub-data section are assembled into sub-data blocks by a sub-data block multiplexor/demultiplexor 66.

The final step in the writing process is to generate the track signals containing the main data blocks and sub data blocks. In order to avoid undesirable flux transitions, each 8-bit byte of the main data and sub-data blocks is transformed into a suitable 10-bit pattern, the resultant bits being termed "channel bits". This transformation is carried out by the 8–10 transformation unit 67 shown in FIG. 3.

After this transformation, a predetermined 10-channel-bit sync field is added to the front of each transformed main data and sub data block thereby forming 360-channel-bit blocks referred to as "recorded main data blocks" and "recorded sub data blocks" respectively. This operation is carried out by multiplexor/demultiplexor 68.

Finally, the recorded data blocks are combined with other types of 360-channel-bit recorded blocks (described below) in multiplexor/demultiplexor 69 to form track signals to be fed alternatively to the head HA and HB of the head drum 70 of the desk 54.

Figure 11:
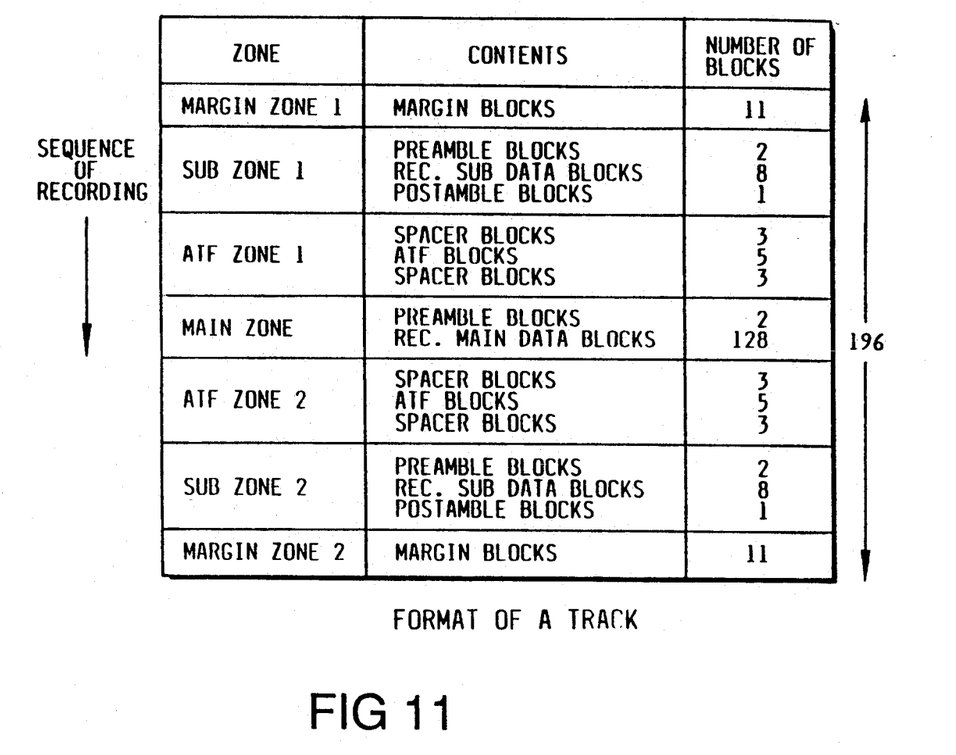
FIG. 11 shows the format of track signals transferred between the DAT electronics and a DAT deck of the FIG. 3 storage device.

The sequence of recorded blocks does, of course, determine the format of each track (this format has already been described in general terms with reference to FIG. 1). A more detailed break down of the composition of each track in terms of recorded blocks is shown in FIG. 11. As can be seen, each track contains 196 recorded blocks with the 128 recorded main data blocks corresponding to one array of a G4 sub-group, being recorded between two groups of eight recorded sub data blocks. In addition to these recorded main data blocks and recorded sub data blocks, the following recorded block types are present:

Margin block, preamble blocks and postamble blocks (repeated channel bits pattern "111")
Spacer blocks (repeated channel bits pattern "100")
ATF blocks (predetermined frequency patterns).

The helical scan tape deck 54 is of standard form compliant with DAT specifications and will not be described in detail herein. The low-level control of the deck is effected by a servo unit 71 which itself is controlled by the system controller 55 The unit 71 also indicates beginning-of-media (BOM) and end-of-media (EOM) conditions to the controller 55. Included within the servo unit 71 is automatic track following (ATF) circuitry that, during writing, generates the ATF blocks and, during reading, utilizes the ATF signals provided by the heads HA, HB to ensure proper alignment of the heads with the tracks recorded on the tape.

The deck 54 also has a pulse generator 72 arranged to generate a pulse output once every revolution of the head drum 70. This pulse output constitutes a frame timing signal FTS as each drum revolution corresponds to the reading/writing of one frame. The FTS signal is phased to mark the beginning of each frame and is used to synchronize the operation of the DAT Electronics and the transfer of data to/from the grouping unit 56, with the operation of the deck 54.

It will be appreciated that the foregoing description of the FIG. 3 drive has concentrated on the functional components of the drive rather than any particular implementation of this functionality. In practice, the processes of the group processor 52 and DAT electronics 53 can be implemented by respective controlling microprocessors with associated application-specific circuitry.

The functioning of the drive during the reading of data is substantially a reverse of the above described write operation but with certain of the auxiliary data assembled during writing being utilized to aid the reading process (for example, error correction codes, block addresses, logical-frame ID).

Furthermore, as well as normal-speed writing and reading, the drive will generally be provided with a fast search capability involving reading the sub areas of occasional frames to locate a desired record.

Audio in DDS

An adapted form of the above DDS drive, embodying the present invention, is described below. This embodiment permits audio data to be recorded within the DDS format without affecting the reading of host data by a standard DDS drive. This is achieved by using amble frames to store audio data. As already noted, the main data area of an amble frame contains no host data, only scrambled zeroes and a four-byte header holding the logical frame ID (LF-ID). Provided the header with its LF-ID is retained, the rest of the main area of an amble frame can be used to store audio data; because the LF-ID of the frame corresponds to an amble frame, this data is ignored by the group processor 52.

More particularly and with reference to FIG. 7, for each G3 sub-group, words 1 to 1455 of both channels A and B are used to store audio data, while words 0 of both channels are kept as the sub-group header with its LF-ID set to zero.

Preferably, but not necessarily, the same audio encoding is used for the audio data inserted into amble frames as is used in the DAT standard. This facilitates recording and reproduction, though account needs to be taken of the fact that the header is not audio data.

Figure 12:
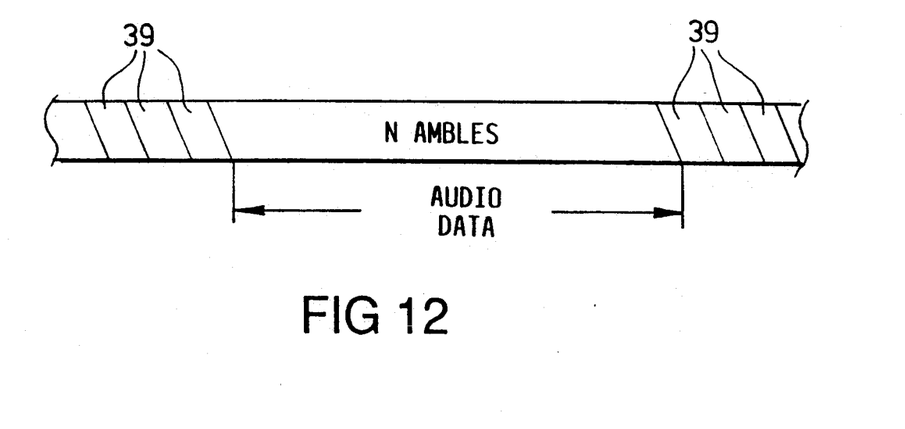
FIG. 12 illustrates the insertion of N ambles between two recorded data groups.

To write any significant amount of audio data, it is, of course, necessary to use a succession of N ambles; FIG. 12 illustrates a block of N ambles recorded between groups 39 containing host data. Upon standard DDS drive reading a tape formatted as in FIG. 12, it will simply ignore the amble frames and only output back to the connected host the contents of the groups 39. However, the embodiment of the present invention described below, will extract audio data contained in the ambles and reproduce the original recorded audio.

Figure 13:
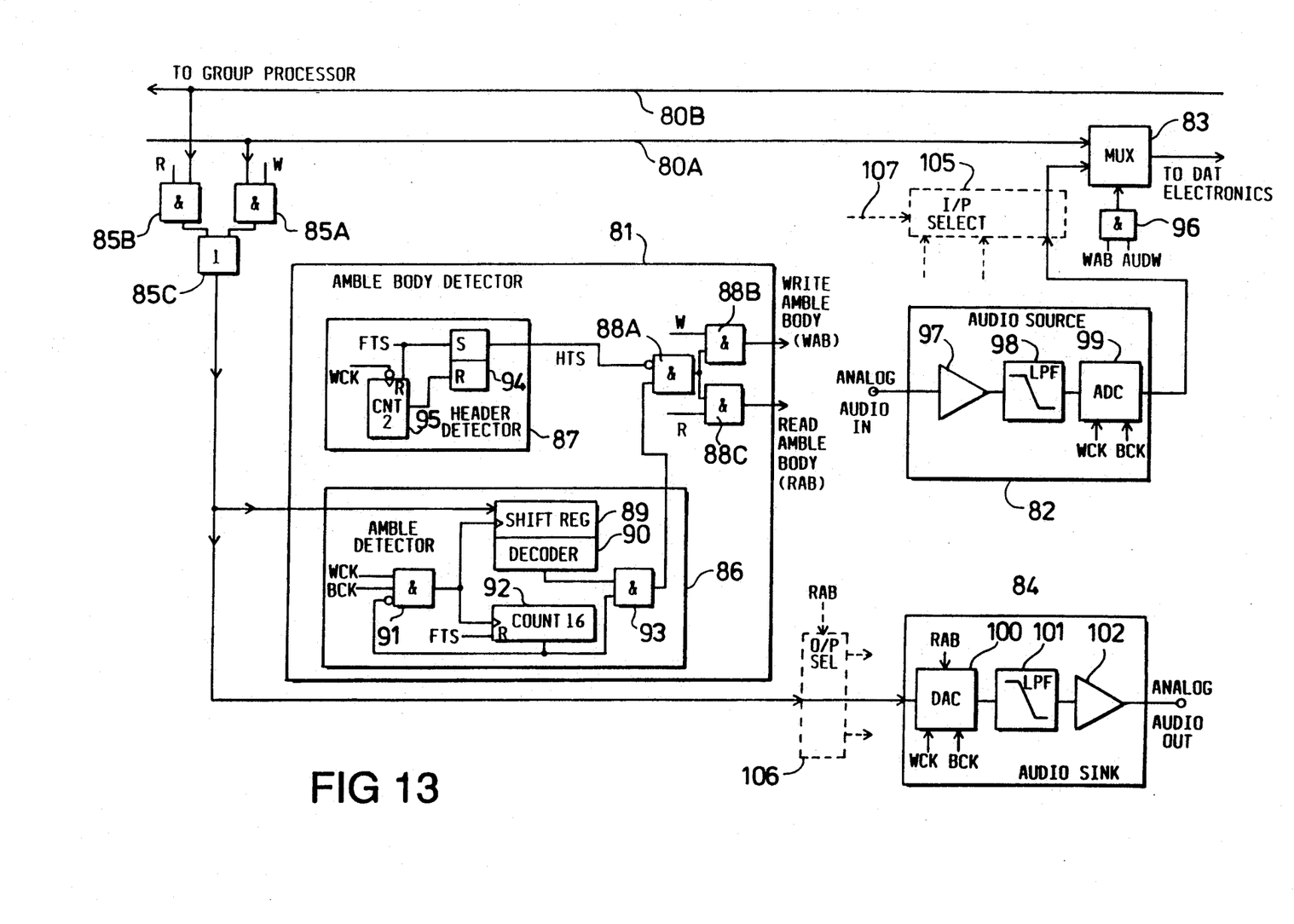
FIG. 13 is a block diagram of audio insertion/extraction circuitry for use with the FIG. 3 storage device.

The embodiment of the invention illustrated in FIG. 13 is intended as a modification to an existing DDS drive design as it requires substantially no modification of the circuitry of the group processor 52 or DAT electronics 53. Instead, the embodiment relies on tapping into the interconnection 80 (FIG. 3) which transfers G3 sub-groups between the group processor 52 and DAT electronics 53.

Figure 14:
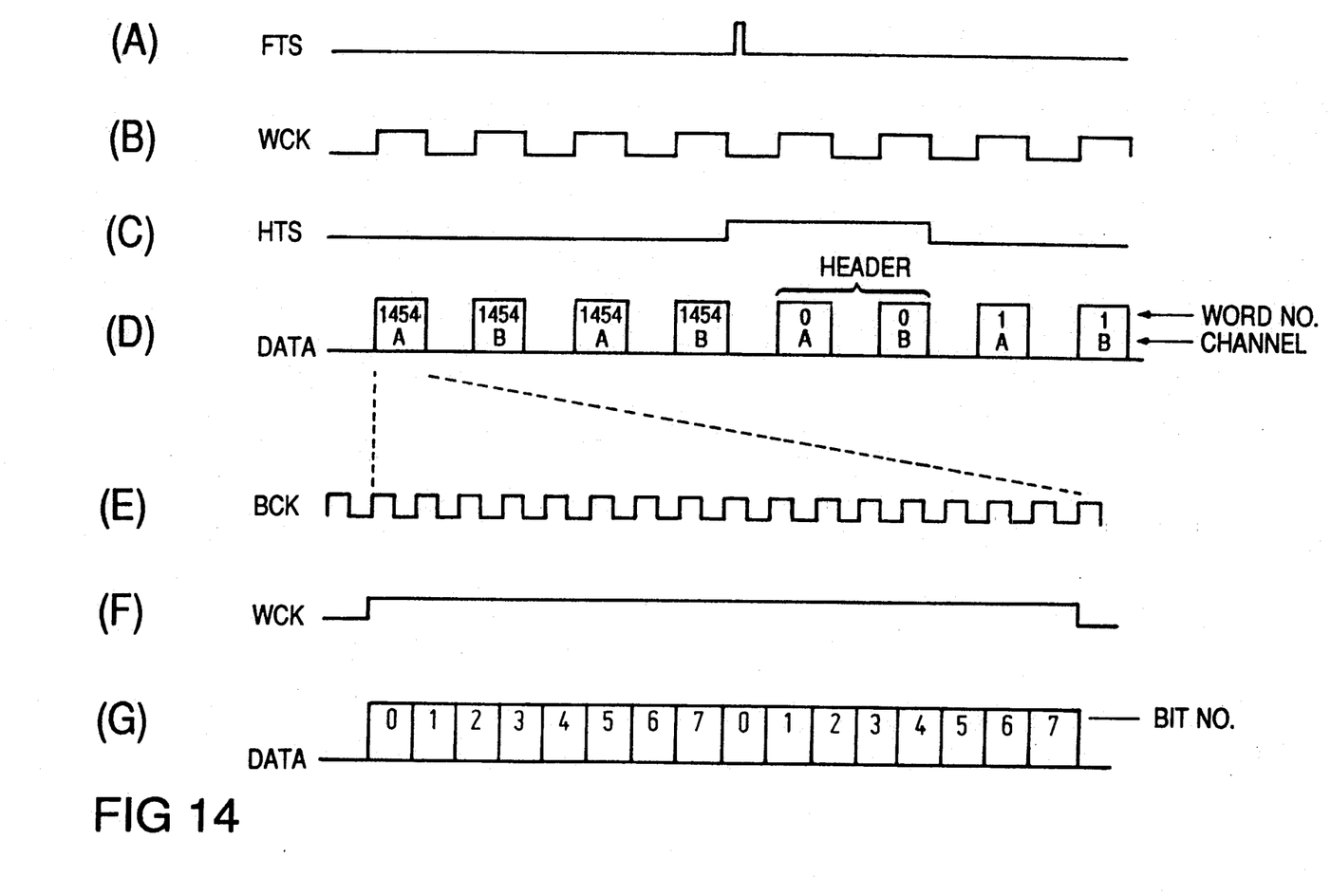
FIG. 14 are time lines illustrating various waveforms relevant to the operation of the FIG. 13 audio insertion/extraction circuitry.

As shown in FIG. 13, the interconnection 80 may be embodied as two uni-directional data lines 80A and 80B, the line 80A transferring G3 sub-groups from the group processor 52 to the DAT electronics during writing and the line 80B effecting the reverse transfer during reading. These transfers are effected as continuous word streams as illustrated by FIG. 14D which shows G3 sub-group words on the interconnection 80, during valid periods as determined by a word clock signal WCK (FIG. 14B) generated by the DAT electronics 53. The word stream portion illustrated in FIG. 14D spans two G3 sub-groups, the start of each sub-group transfer over the interconnection 80 being determined by the frame timing signal FTS (FIG. 14A).

The first two words of each new G3 sub-group are the header words of that sub-group. As will be described below, a header timing signal HTS (FIG. 14C) can be generated from the FTS signal and word clock WCK to indicate the presence of the header words on the interconnection 80.

The time lines of FIG. 14E, F and G show the sixteen-bit data content of the two bytes of each word (FIG. 14G) in relation to a bit clock signal BCK (FIG. 14E) and the word clock WCK (FIG. 14F). The bit clock signal BCK is generated by the DAT electronics 53.

During data writing, the FIG. 13 embodiment examines the LF-ID in the header of each G3 sub-group placed on line 80A by the group processor 52. All non-amble sub-groups are allowed to pass from the group processor 52 to the DAT electronics 53. For an amble sub-group the two header words are also allowed to pass unaltered; however, audio data is injected in place of the remaining words of the amble sub-group. During data reading, the FIG. 13 embodiment examines the LF-ID in each G3 sub-group placed on line 80B and taps off the non-header portion of amble sub-groups for audio processing.

Of course, during data reading, amble sub-groups occur on line 80B as written to tape initially and the FIG. 13 circuitry simply has to extract any audio data that may be present. In contrast, in order to write audio data, it is necessary to take suitable measure to ensure that the group processor 52 outputs sufficient amble sub-groups on line 80A, it generally being inadequate to rely on normal operation of the DDS drive to produce the desired amble sub-groups. In fact, in standard DDS drives with SCSI interfaces (Small Computer System Interface) such as that available from Hewlett-Packard Limited, it is possible to command the drive over the interface 50 to write successive groups of, for example, 25 ambles. This is possible using what is known as the 'short erase' command (the reason for this name is that the writing of ambles effectively erases any data previously present on the tape). The short erase command is passed via the interface 50 to the system controller 55 which, in turn, instructs the amble-control unit 45 of the group processor 52 to write 25 amble sub-groups. Short erase commands may be strung together to write any multiple of twenty five amble frames and provided the commands have their 'immediate bit' set and each command arrives within 15 ms of the previous one, the drive will 'stream', that is, write ambles without a break. Although a host computer could be used to command amble generation in this manner, it is more convenient to provide a local short-erase command input into the system controller 55 to permit local control of amble generation; such a local command input is effectively a local "audio write" command inasmuch as the resultant ambles can then be used for audio writing. It will, of course, be apparent to persons skilled in the art that the output of amble sub-groups can be commanded via the system controller 55 without specifically using the short-erase command; for example, the amble-control unit 45 could be controlled to produce a continuous stream of ambles while audio data continues to be supplied to the drive.

Having described the general principle of operation of the FIG. 13 embodiment, a detailed description will now be given of the audio-data insertion/extraction circuitry.

The FIG. 13 circuitry comprises an amble body detector 81 arranged to detect and signal the presence of the non-header portion (the body) of an amble G3 sub-group on the interconnection 80, an audio source 82, a multiplexor 83 for injecting the output of the audio source 81 into the write line 80A of the interconnection 80, and an audio sink 84 for tapping off and processing audio data from the read line 80B of interconnection 80.

The amble body detector 81 is fed with the signals on the operative one of the lines 80A, 80B, this being line 80A during data writing and line 80B during data reading. Line selection is effected by AND gates 85A, 85B and OR gate 85C. The gate 85A is connected to line 80A, a enabled by a signal W asserted by the system controller 55 during data writing; the gate 85B is connected to line 80B and is enabled by a signal R asserted by the controller 55 during data reading.

The amble body detector 81 comprises an amble detector 86, a header detector 87, and output gates 88.

The amble detector 86 is fed with the signal on the operative line 80A/B via the gates 85. This signal is passed to a shift register 89, with an associated decoder 90, for the purpose of capturing the header of each G3 sub-group and determining whether its LF-ID is zero, thereby indicating an amble sub-group. The shift register 89 is clocked by the output of an AND gate 91 fed with the word and bit clock signals WCK and BCK. When the gate 91 is enabled by its third input, successive bits of the data words on the operative line 80A/B are clocked into the register 89. The third, enabling input to the gate 91 is provided by the inverted output of a count-to-16 counter 92. This counter is arranged to be reset by the frame timing signal FTS following which its output is de-asserted (enabling gate 91) until a count of 16 is reached when its output is asserted (disabling gate 91). The counter 92 is clocked by the same signal as the shift register 89. In operation, the counter 92 permits the first sixteen bits of each new sub-group (that is, the first header word) to be clocked into the shift register 89 before disabling the gate 91 and freezing the contents of register 89. The decoder 90 decodes the LF-ID bits of the first header word and if these bits corresponds to the amble frame ID of zero, the output of the amble detector is asserted. A gate 93 connected to the output of counter 92 prevents the amble detector output being asserted until the first header word has been fully clocked into the shift register 89.

The header detector 87 comprises a flip flop 94 arranged to be set by the frame timing signal FTS and reset by the output of a count-to-two counter 95 clocked by the falling edge of the word clock signal WCK. The counter 95 is reset by the signal FTS so that its output is asserted at the end of the second word following the start of a frame, that is, at the end of the G3 sub-group header. The non-inverted output of the flip flop 94 thus provides a header timing signal HTS of the form shown in FIG. 14C.

The output HTS of the header detector 87 and the output of the amble detector 86 are combined in gate 88A to produce a signal that is asserted only during the non-header words of an amble sub-group (that is, during the amble body). The gate 88A is an AND gate with an inverting input to which the signal HTS is connected. The amble body signal output by gate 88A is fed to two further AND gates 88B and 88C respectively fed with the signals W and R. The output of gate 88B constitutes a write-amble-body (WAB) signal that is asserted when amble body words are present on the write line 80A. The output of gate 88C constitutes a read-amble-body (RAB) signal that is asserted when amble body words are present on the read line 80B.

The write-amble-body signal WAB is fed to an AND gate 96 together with a signal AUDW. This latter signal is asserted by the system controller 55 whenever audio data is to be written to tape (the signal W will always be asserted when AUDW is asserted but not the other way around as it may not be desired to write audio data during certain writing sessions). When both WAB and AUDW are asserted, the multiplexor 83 switches from its normal state of transmitting words output by the group processor 52, to a state in which audio data words from the audio source 82 are transmitted to the DAT electronics 53. In this manner, the non-header words of an amble sub-group are replaced by audio data words.

The audio source 82 comprises an analog input, an analog amplifier 97, a low-pass filter 98, and an analog-to-digital converter 99 clocked by the word and bit clocks WCK and BCK whereby to produce audio data words synchronized to the words on the line 80A.

Assuming the group processor 52 provides an uninterrupted succession of amble sub-groups, audio data will be written to tape in much the same way as DAT audio data with the exception that two words of every sub-group, namely the header words, are not audio data.

The read-amble-body signal RAB is fed to the audio sink 84 to enable the latter during the non-header portions of amble sub-groups read from tape and passed along line 80B. The audio sink 84 comprises a digital-to-analog (DAC) converter 100, a low-pass filter 101 and an analog output amplifier 102. The DAC 100 is fed with the data words on the operative line 80A/B and is clocked by the word and bit clocks WCK, BCK. However, the operation of DAC 100 is frozen unless the RAB signal is asserted. As a result, the DAC 100 is only operative to convert to analog, amble body words read from tape. Any audio data present in amble frames recorded to tape will thus be reproduced Note that when the signal RAB is de-asserted during amble headers, the DAC 100 is arranged to maintain its previous output, thereby to cover for the non-audio header words.

In summary, to write audio data the DDS drive is caused to output ambles on write line 80A by a local 'short erase' command (or in some other suitable manner) The non-header portions of these ambles are detected by the amble body detector 81 and signalled by signal WAB. As a result, the multiplexor 83 replaces the amble body words with audio data words. During reading, the amble body detector 81 detects the non-header portions of ambles on read line 80B and indicates these portions by signal RAB. This signal enables the audio sink 84 to convert to analog the data words on line 80B.

A number of variations to the FIG. 13 embodiment are, of course, possible. For example, where the audio source 82 is not clocked by the drive signals WCK, BCK but by an independent clock of the same nominal frequency, then a first-in, first-out buffer will need to be provided to smooth the flow of data between the source and multiplexor 83. Furthermore, the timing of the start of each G3 sub-group relative to the FTS signal may differ from that shown in FIG. 14 (indeed, this timing may differ between read and write operations). However, it is well within the competence of persons skilled in the art to devise appropriate clocking and writing circuitry to identify the start of each sub-group and the header words within such a sub-group. Another possible variant would be to identify ambles by storing the LF-ID in a sub-code; indeed, according to the DDS format, byte 7 of pack item 3 contains the LF-ID and this pack item is stored in every frame; upon reading a tape, the drive could use this sub-code LF-ID to identify ambles rather than monitoring the headers for their LF-IDs.

The FIG. 13 embodiment has the advantage of requiring minimal changes to an existing DDS drive. However, where minimising design changes is not of overriding importance, another approach would be to insert/extract audio data at the point of generation/removal of amble body data itself—that is, within the amble-control unit 45 of the group processor 52. In this case, the amble-control unit 45 is selectively operable in a first, normal, mode to generate amble body data as a string of zeroes (standard amble), or in a second, audio, mode to generate amble body data by using audio data (audio amble). For audio ambles, the amble body data is extended to provide all words 1 to 1455 of a G3 sub-group and no padding bytes are added in multiplexor 59 as is the case with standard ambles. The amble headers are generated by the grouping unit 56 and are the same for standard and audio ambles. The actual details of such an implementation will depend on the basic group processor design but, again, are well within the competence of persons skilled in the art. One advantage of this particular implementation is that the audio data will be randomized in randomizer 58 which is not the case for the FIG. 13 embodiment.

As already indicated, the command of the drive to write ambles for the storage of audio data can be done remotely from a host using the short-erase command, or locally by providing for local input of this command, or another command causing amble generation, to the system controller 55 This local input case is preferred as it enables the drive to be used independently of any host to read/write audio data. For local control purposes, the drive can be provided with a local interface to the system controller enabling all required functions to be implemented, such as "audio write" (generation of a command to the amble-control unit 45 causing ambles to be produced; generation of signals W and AUDW for FIG. 13 embodiment), "audio play" (generation of signal R for FIG. 13 embodiment), "rewind" and "eject".

The foregoing description has concentrated on the storage of audio data in ambles. However, instead of audio data, other auxiliary data, including asynchronous data, can be stored in the ambles. Where the data is asynchronous, it would be possible to arrange for a fixed number of amble frames to be generated following each group and to use these frames for storing the auxiliary data (it is unlikely that such an arrangement would be suitable for synchronous data particularly where a read-after-write recording method is used in which bad frames within a group are rewritten causing the groups to have an indeterminate number of physical frames). For small amounts of asynchronous data, it may in certain circumstances be possible simply to rely on ambles generated during the normal course of operation of a DDS drive.

It is also possible to arrange for the auxiliary data which is to be written into the ambles, to be derived from any one of a number of different sources. In this case, input selection means 105 shown in dashed lines in FIG. 13 may be provided having a selection control input 107; audio data would then be just one possible selectable source. In order to facilitate source identification, the input selection means can be arranged to include into the selected auxiliary data, a source identifier, for example, at a predetermined word position (the requisite timing signals for effecting the insertion of such a source identifier are not shown in FIG. 13 but their generation and utilization will be apparent to persons skilled in the art).

Where multi-source auxiliary data is written to tape, output selection means 106 (shown dashed in FIG. 13) are preferably provided in the line tapped off the read-line 80A. The output selection means is arranged to recognise the source identifier included in the auxiliary data and to direct the output of this data appropriately.

As an alternative to including a source identifier in the auxiliary data itself, this information could be written in a preceding group as 'host' data either via the host or by modification of the FIG. 3 drive to permit local writing of data into groups.

Indeed, any data about the auxiliary data stored in ambles, can be written in a normal group that precedes (or follows) the ambles. Thus, where the auxiliary data is audio data, a plurality of audio passages ('tracks' in normal audio record parlance) can be stored on tape each preceded by a group containing a filemark identifying the audio track. An index to tracks could then be stored in the first group enabling a user to select a track which the drive is then arranged to access via a fast search on filemarks, and play.

The interleaving between host data and audio lends itself to educational/documental applications. For instance, if the group data preceding an audio amble area is a computer program (which would be run by the host upon loading) containing a diagram, picture or animation, then the following audio could be a commentary on or explanation of the displayed material.

Finally, it will of course be appreciated that although the foregoing description has been given in terms of a drive generally implementing the DDS format, many of the details of that format are not relevant to the present invention or its preferred embodiment described above. Thus for example, at a low level the exact nature of the polynomial characterizing the randomizer is not relevant to the present invention and above described preferred embodiment of the invention is independent of this polynomial. More generally, however, the present invention is applicable to drives implementing other formats where tracks implementing auxiliary functions, such as group separation and/or padding, are capable of being used to store auxiliary data.

We claim:

1. A tape storage device comprising:

helical-scan recording means operative to write to tape in a succession of tracks each having a data area for the storage of data, and signal processing means operative to receive first data signals, representative of first data to be stored, and to process said first data signals to generate and output track signals to said recording means whereby to cause the latter to write the first data to tape in accordance with a predetermined format in which said first data is stored in the data areas of one or more groups of tracks with further tracks, hereinafter "amble" tracks, being used to perform auxiliary functions including bufferizing/padding functions, the said groups of tracks and said amble tracks including identifiers distinguishing them from each other;

said signal processing means including insertion means arranged to receive second data signals, representative of second data to be stored, and operative to cause said second data to be written in the data areas of amble tracks;

wherein said first and second data signals are received from externally of said tape storage device; and said signal processing means comprises a first write-processing section arranged to receive said first data signals and to generate intermediate signals for constituting the data areas both of said groups of tracks and of said amble tracks, and a second write-processing section operative to produce said track signals from said intermediate signals; said insertion means including: amble detection means connected to monitor said intermediate signals whereby to detect the signals for constituting said amble data areas; and multiplexor means connected to receive both said intermediate signals and said second data signals and selectively operable to pass one or other of these signals to said second write-processing means; the amble detector means being connected to control said mulitplexor means such that said intermediate signals are normally passed to said second write-processing means with said second data signals only being passed to the second write-processing means during the time, or a portion thereof, when the amble-data-area signals are detected.

2. A tape storage device according to claim 1, wherein said insertion means is operative when second data is to be stored, to cause said signal processing means to generate a succession of amble tracks storing the second data.

3. A tape storage device according to claim 1, wherein said first write-processing section is operative to generate, as part of said intermediate signals, identification signals for distinguishing between said groups of tracks and said amble tracks, said insertion means being operative to allow said identification signals, including those associated with amble tracks, to pass unaltered to said second write-processing means.

4. A tape storage device according to claim 1, wherein said recording means is operative to write tracks in pairs hereinafter referred to as "frames", said signal processing means including header means for generating for each frame a header including an identifier indicative of whether the frame contains tracks storing first data or amble tracks, the signal processing means being operative to store the headers generated by the header means in the corresponding frames.

5. A tape storage device according to claim 1, wherein said second data is audio data, the storage device including audio input means for providing a digitized audio signal as said second data signal, the audio digitization being synchronized with the operation of said recording means.

6. A tape storage device according to claim 1, wherein said second data is derived from any one or more of a plurality of sources, the storage device including input selection means for selecting between a plurality of different input sources for the provision of said second data, and means for storing a source identifier either as part of said second data or as first data in an associated said group of tracks.

7. A tape storage device for reading first data that has been written to tape in accordance with a predetermined recording format in which the tape is written using a helical-scan recording method to form a succession of tracks each of which has a data area for the storage of data, said first data being stored in the data areas of one or more groups of tracks with further tracks, hereinafter "amble" tracks, being used to perform auxiliary functions including buffering/padding functions, the said groups of tracks and said amble tracks including identifiers distinguishing them from each other said storage device comprising:

helical-scan reading means operative to read said tape and to output track signals representative of the tracks recorded thereon, and signal processing means operative to receive said track signals from the helical-scan reading means and to process said track signals to generate and output first data signals representative of said first data recorded in the data areas of said groups of tracks, said processing involving distinguishing signals derived from said groups of tracks from signals derived from said amble tracks whereby to avoid any contents of said amble tracks being treated as first data;

said signal processing means including extraction means operative to extract from the data areas of said amble tracks any second data written therein and to generate and output second data signals representative of any such second data;

wherein said signal processing means comprises a first read-processing section arranged to receive said track signals and to generate intermediate signals representative of the contents of the data areas both of said groups of tracks and of said amble tracks, and a second read-processing section operative to produce said first data signals from said intermediate signals; said extraction means including: amble detection means connected to monitor said intermediate signals whereby to detect the signals representative of the contents of said amble data areas, and output means connected to receive said intermediate signals and controlled by said amble detection means to utilize said signals representative of the contents of said amble data areas as the second data signals.

8. A tape storage device according to claim 1, wherein said tracks have been written to tape in pairs hereinafter referred to as "frames", each frame having an associated header including an identifier indicative of whether the frame contains tracks storing first data or amble tracks, the signal processing means being operative to monitor the headers to differentiate data written in said groups of tracks from data written in said amble tracks.

9. A tape storage device according to claim 1, wherein said second data is audio data, the storage device including audio data output means.

10. A tape storage device according to claim 1, wherein said second data is derived from any one or more of a plurality of sources and a source identifier is stored as part of said second data or as first data in an associated said group of tracks, the storage device including output selection means responsive to said source identifier to select between a plurality of different outputs for said second data.

11. A tape storage device according to claim 1, wherein said predetermined format is substantially in accordance with the Digital Data Storage Format including header and non-header portions but the tape storage device including means for replacing the non-header portions of the data areas of at least some amble tracks with said second data.

12. A tape storage device, comprising:
 (a) helical-scan means for writing data to tape in a succession of tracks each having a data area for the storage of data;
 (b) signal processing means for receiving first data signals representing first data to be stored and for processing said first data signals to generate and output track signals to said helical-scan means to cause said helical-scan means to write the first data to tape in accordance with a predetermined format in which said first data is stored in the data areas of one or more groups of tracks with amble tracks for performing auxiliary functions including bufferizing/padding functions, the said groups of tracks and amble tracks being distinguishable from each other by identifiers contained therein;
 (c) audio input means for providing a digitized audio data signal representing audio data; and
 (d) insertion means for receiving said audio data signal and for causing said audio data to be written in the data areas of amble tracks;
 wherein:
 (1) said signal processing means includes:
  a group processor section arranged to receive said first data signals and to generate intermediate signals for constituting the data areas both of said groups of tracks and of said amble tracks, and
  a digital audio tape (DAT) electronics section operative to produce said track signals from said intermediate signals;
 (2) said insertion means includes:
  amble detector means for monitoring said intermediate signals and detecting said amble data areas, and
  mulitplexor means for receiving both said intermediate signals and said audio data signals and selectively passing these signals to said DAT electronics section, the amble detector means being coupled to control said mulitplexor means such that said intermediate signals are normally passed to said DAT electronics means and said audio data signals are only passed to the DAT electronics means during the time, or a portion thereof, when the amble data areas are detected; and
 (3) said group processor means is operative to generate, as part of said intermediate signals, identification signals for distinguishing between said groups of tracks and said amble tracks, said insertion means being operative to allow said identification signals, including those associated with amble tracks, to pass unaltered to said DAT electronic means.

13. A tape storage device according to claim 12, further comprising insertion means for causing said signal processing means to generate a succession of amble tracks.

14. A tape storage device according to claim 12 wherein said helical-scan means is operative to write tracks in frames and further comprising:
 means for generating for each frame a header including an identifier indicative of whether the frame contains tracks storing first data or amble tracks;
 means for storing the headers in the corresponding frames;
 input selection means for selecting between a plurality of different input sources for the provision of said audio data; and
 means for storing a source identifier either as part of said audio data or as first data in an associated group of tracks.

15. A tape storage device comprising:
 helical-scan formatting the recording means operative to format signals fed thereto and to write these formatted signals to tape in a succession of tracks each having a data area for the storage of data, and
 signal processing means comprising:
 first processing means operative to receive from externally of said device first external data signals, representative of first data to be stored, and to process said first external data signals to generate and output first intermediate data signals to said formatting and recording means whereby to cause the latter to write the first data to tape in the data areas of one or more groups of tracks, each said group of tracks including a first identifier for identifying these tracks as such;
 amble means for generating and outputting amble signals to said formatting and recording means whereby to cause the latter to write tracks, hereinafter "amble tracks", with internally-provided dummy data in their data areas and each including a second identifier different from said first identifier whereby to enable the said groups of tracks and said amble tracks to be distinguished from each other upon reading;
 second processing means operative to receive from externally of said device second external data signals, representative of said data to be stored, and to process said second external data signals to generate and output second intermediate data signals to said formatting and recording means whereby to cause the latter to write the second data to tape in the data areas of one or more further tracks, each said further track including a said second identifier enabling these tracks to be distinguished from said groups of tracks upon reading; and control means for coordinating operation of said first processing means, said amble means, and said second processing means.

16. A tape storage device according to claim 15, wherein said second processing means includes:

detector means for monitoring said amble signals output by said amble means whereby to generate an enable signal indicative of the presence of portions of said amble signals corresponding to the data areas of intended said amble tracks, and multiplexer means connected to receive both said amble signals and said second intermediate data signals and selectively operable to pass a selected one of these signals to the formatting and recording means, the detector means being connected to control said multiplexor means such that said amble signals are normally passed to said formatting and recording means with said second intermediate data signals only being passed to the formatting and recording means during the time, or a part thereof, when said enable signal indicates the presence of said portions of the amble signals corresponding to amble track data areas.

17. A tape storage device according to claim 16, wherein said amble means generates as part of said amble signals second-identifier signals for producing said second identifiers, said second-identifier signals being outside of the said portions of said amble signals corresponding to the data areas of the intended amble tracks whereby said second-identifier signals pass through said multiplexer means to said formatting and recording means.

18. A tape storage device according to claim 16, wherein said control means is operative to cause said amble means to output sufficient amble signals to accommodate said second intermediate data signals.

19. A tape storage device according to claim 15, wherein said second data is audio data, the storage device including audio input means for providing a digitized audio signal as said second data signal, the audio digitization being synchronized with the operation of the recording means.

20. A tape storage device according to claim 15, wherein said second data is derived from any one or more of a plurality of sources, the storage device including input selection means for selecting between a plurality of different input sources for the provision of said second data, and means for storing a source identifier either as part of said second data or as first data in an associated said group of tracks.

* * * * *